(12) United States Patent
Shroff et al.

(10) Patent No.: US 12,096,112 B2
(45) Date of Patent: Sep. 17, 2024

(54) USER INTERFACE TO SELECT FIELD OF VIEW OF A CAMERA IN A SMART GLASS

(71) Applicant: Meta Platforms Technologies, LLC, Menlo Park, CA (US)

(72) Inventors: Sapna Shroff, Burlingame, CA (US); Sebastian Sztuk, Menlo Park, CA (US); Johana Gabriela Coyoc Escudero, Union City, CA (US); Jun Hu, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/831,305

(22) Filed: Jun. 2, 2022

(65) Prior Publication Data

US 2023/0031871 A1    Feb. 2, 2023

Related U.S. Application Data

(60) Provisional application No. 63/227,240, filed on Jul. 29, 2021, provisional application No. 63/227,238, (Continued)

(51) Int. Cl.
*G06V 20/00*    (2022.01)
*G02B 27/01*    (2006.01)
(Continued)

(52) U.S. Cl.
CPC .......... *H04N 23/64* (2023.01); *G02B 27/0172* (2013.01); *G02C 7/101* (2013.01);
(Continued)

(58) Field of Classification Search
CPC ........ H04N 23/64; H04N 23/56; H04N 23/62; H04N 23/63; H04N 23/66; H04N 23/695;
(Continued)

(56) References Cited

U.S. PATENT DOCUMENTS 6,972,771 B2 * 12/2005 Nakano ................ G09G 5/00
345/589
9,179,061 B1   11/2015 Kraft et al.
(Continued)

OTHER PUBLICATIONS

EPO—International Search Report and Written Opinion for International Application No. PCT/US2022/038849, mailed Nov. 9, 2022, 10 pages.
(Continued)

*Primary Examiner* — Frank F Huang
(74) *Attorney, Agent, or Firm* — McDermott Will & Emery LLP (57) ABSTRACT

A wearable device for use in immersive reality applications is provided. The wearable device has a frame including an eyepiece to provide a forward-image to a user, a first forward-looking camera mounted on the frame, the first forward-looking camera having a field of view within the forward-image, a sensor configured to receive a command from the user, the command indicative of a region of interest within the field of view, and an interface device to indicate to the user that a field of view of the first forward-looking camera is aligned with the region of interest. Methods of use of the device, a memory storing instructions and a processor to execute the instructions to cause the device to perform the methods of use, are also provided.

20 Claims, 6 Drawing Sheets

Related U.S. Application Data filed on Jul. 29, 2021, provisional application No. 63/227,231, filed on Jul. 29, 2021.

(51) Int. Cl.

| | |
|---|---|
| G02C 7/10 | (2006.01) |
| G02C 7/16 | (2006.01) |
| G06F 3/01 | (2006.01) |
| G06F 3/044 | (2006.01) |
| G06F 3/16 | (2006.01) |
| G06F 40/205 | (2020.01) |
| G06V 10/25 | (2022.01) |
| G06V 10/75 | (2022.01) |
| G06V 20/50 | (2022.01) |
| G10L 17/06 | (2013.01) |
| G10L 17/22 | (2013.01) |
| H04N 23/56 | (2023.01) |
| H04N 23/60 | (2023.01) |
| H04N 23/62 | (2023.01) |
| H04N 23/63 | (2023.01) |
| H04N 23/66 | (2023.01) |
| H04N 23/695 | (2023.01) |
| H04N 23/90 | (2023.01) |

(52) U.S. Cl.
CPC ............ *G02C 7/16* (2013.01); *G06F 3/013* (2013.01); *G06F 3/016* (2013.01); *G06F 3/017* (2013.01); *G06F 3/044* (2013.01); *G06F 3/167* (2013.01); *G06F 40/205* (2020.01); *G06V 10/25* (2022.01); *G06V 10/759* (2022.01); *G06V 20/50* (2022.01); *G10L 17/06* (2013.01); *G10L 17/22* (2013.01); *H04N 23/56* (2023.01); *H04N 23/62* (2023.01); *H04N 23/63* (2023.01); *H04N 23/66* (2023.01); *H04N 23/695* (2023.01); *H04N 23/90* (2023.01); *G02B 2027/0138* (2013.01); *G02B 2027/0141* (2013.01); *G02B 2027/0178* (2013.01)

(58) Field of Classification Search
CPC ............ H04N 23/90; G02B 27/0172; G02B 2027/0138; G02B 2027/0141; G02B 2027/0178; G02B 27/0093; G02C 7/101; G02C 7/16; G02C 11/10; G06F 3/013; G06F 3/016; G06F 3/017; G06F 3/044; G06F 3/167; G06F 40/205; G06V 10/25; G06V 10/759; G06V 20/50; G06V 10/235; G06V 40/19; G06V 40/67; G06V 10/94; G10L 17/06; G10L 17/22
See application file for complete search history.

(56) References Cited

U.S. PATENT DOCUMENTS

| | | | |
|---|---|---|---|
| 10,012,506 B1 | 7/2018 | Monahan et al. | |
| 10,667,981 B2 * | 6/2020 | Osterhout | G06F 3/012 |
| 10,849,817 B2 * | 12/2020 | Border | G06F 3/013 |
| 11,047,693 B1 | 6/2021 | Schaefer | |
| 11,128,636 B1 | 9/2021 | Jorasch et al. | |
| 11,520,399 B2 * | 12/2022 | Kang | A63F 13/46 |
| 11,531,402 B1 * | 12/2022 | Stolzenberg | G06F 3/04815 |
| 11,546,505 B2 * | 1/2023 | Canberk | G06F 3/04815 |
| 11,556,220 B1 * | 1/2023 | Inch | G06F 3/04845 |
| 11,609,625 B2 * | 3/2023 | Johnson | G06F 3/017 |
| 11,625,103 B2 * | 4/2023 | Schoen | G06F 3/012 |
| | | | 345/157 |
| 11,636,655 B2 * | 4/2023 | Ma | G06Q 50/01 |
| | | | 345/633 |
| 11,637,999 B1 * | 4/2023 | Tichenor | G02B 27/0172 |
| | | | 345/633 |
| 11,651,573 B2 * | 5/2023 | Tichenor | G06V 10/945 |
| | | | 345/633 |
| 2008/0036875 A1 * | 2/2008 | Jones | H04N 23/63 |
| | | | 348/E7.086 |
| 2012/0242698 A1 * | 9/2012 | Haddick | G06Q 30/02 |
| | | | 345/633 |
| 2013/0187786 A1 | 7/2013 | Dadlani Mahtani et al. | |
| 2013/0222235 A1 | 8/2013 | Abdollahi et al. | |
| 2013/0257899 A1 * | 10/2013 | Baron | G06T 19/006 |
| | | | 345/619 |
| 2014/0062962 A1 * | 3/2014 | Jang | G06F 3/04883 |
| | | | 345/175 |
| 2014/0198055 A1 * | 7/2014 | Barkway | G06F 3/04883 |
| | | | 345/173 |
| 2014/0223647 A1 | 8/2014 | Long et al. | |
| 2014/0361971 A1 * | 12/2014 | Sala | G06F 3/013 |
| | | | 345/156 |
| 2015/0025794 A1 | 1/2015 | Long et al. | |
| 2015/0177514 A1 * | 6/2015 | Maimone | G02B 27/0101 |
| | | | 345/8 |
| 2015/0310657 A1 | 10/2015 | Eden | |
| 2016/0080874 A1 | 3/2016 | Fullam | |
| 2017/0122771 A1 * | 5/2017 | Keal | H04W 88/00 |
| 2018/0074600 A1 | 3/2018 | Park | |
| 2018/0081178 A1 | 3/2018 | Shpunt | |
| 2018/0157045 A1 | 6/2018 | Davami | |
| 2019/0011703 A1 | 1/2019 | Robaina et al. | |
| 2019/0371075 A1 | 12/2019 | Stafford et al. | |
| 2019/0377416 A1 * | 12/2019 | Alexander | G06F 3/04815 |
| 2020/0034617 A1 | 1/2020 | Croxford et al. | |
| 2021/0081047 A1 | 3/2021 | Wang et al. | |
| 2021/0191127 A1 | 6/2021 | Haddick et al. | |
| 2021/0304509 A1 | 9/2021 | Berkebile | |
| 2021/0390882 A1 | 12/2021 | Iyengar et al. | |
| 2023/0316698 A1 | 10/2023 | Agrawal et al. | |

OTHER PUBLICATIONS

EPO—International Search report and Written Opinion for International Application No. PCT/US2022/038933, mailed Nov. 16, 2022, 10 pages.

* cited by examiner

USER INTERFACE TO SELECT FIELD OF VIEW OF A CAMERA IN A SMART GLASS

CROSS-REFERENCE TO RELATED APPLICATIONS

The present disclosure is related and claims priority under 35 USC. § 119(e) to U.S. Prov. Pat. Appln. No. 63/227,231, entitled SMART GLASS DEVICES WITH REGION OF INTEREST DETECTION USING EYE TRACKING, to U.S. Prov. Pat. Appln. No. 63/227,238, entitled SMART GLASS DEVICES WITH GESTURE BASED REGION OF INTEREST DETECTION, and to U.S. Prov. Pat. Appln. No. 63/227,240, entitled SMART GLASS DEVICES WITH REGION OF INTEREST CORRECTION VIA PARTIAL GLASS SHADING, filed on Jul. 29, 2021, to Sapna SHROFF et-al., the contents of which applications are hereby incorporated herein by reference in their entirety, for all purposes.

BACKGROUND

Field

The present disclosure is related to user interfaces in smart glass devices that include one or more cameras for recording images and video. More specifically, the present disclosure is related to methods for identifying a region of interest in a user field of view using eye tracking tools, and providing non-invasive feedback to the user to make the user's region of interest consistent with the field of view of the one or more cameras in the smart glasses.

Related Art

Many electronic appliances today include, embedded within a wearable framework, one or more cameras that the user may activate to collect pictures or videos. However, in many cases, the user collects images and videos that do not match the region of interest of the user's field of view at the time of collection. This happens because the angle and field of view of the one or more cameras is generally not the same as that of the user. In certain types of electronic appliances, this inconsistency may be cured by providing direct feedback to the user, on a display, of the field of view of the one or more camera accessories. The user can then manually modify camera position and optical configuration (magnification, aperture size, and the like) to make it consistent with a region of interest. However, this approach requires the use of a display, which may not be available in some appliances, and the focused attention of the user to correct the inconsistencies. In some appliances having a display, it may still be desirable to use the real estate therein for maximizing user enjoyment rather than for hardware adjustments.

BRIEF DESCRIPTION OF THE DRAWINGS

In the figures, elements having the same or similar label number share the same or similar features, unless stated explicitly otherwise.

SUMMARY

In a first embodiment, a frame including an eyepiece to provide a forward-image to a user, a first forward-looking camera mounted on the frame and having a field of view within the forward-image, a sensor configured to receive a command from the user, the command indicative of a region of interest within the forward-image, and an interface device to indicate to the user that a field of view of the first forward-looking camera is aligned with the region of interest.

In a second embodiment, a computer-implemented method includes receiving, in a first camera device mounted on a smart glass system, a command from a user, the command being indicative of an area of interest in a forward-image displayed to the user, determining a boundary of the area of interest based on the command, and providing a feedback to the user based on an overlap between the area of interest and a field of view of the first camera device.

In a third embodiment, a system includes a memory storing instructions and one or more processors to execute instructions and cause the system to perform a method. The method includes receiving, in a first camera device mounted on a smart glass system, a command from a user, the command being indicative of an area of interest within a forward-image displayed to the user, determining a boundary of the area of interest based on the command, and providing a feedback to the user based on an overlap between the area of interest and a field of view of the first camera device.

In yet another embodiment, a system includes a first means to store instructions and a second means to execute the instructions to cause the system to perform a method, the method including receiving, in a first camera device mounted on a smart glass system, a command from a user, the command being indicative of an area of interest in a forward-image displayed to the user, determining a boundary of the area of interest based on the command, and providing a feedback to the user based on an overlap between the area of interest and a field of view of the first camera device.

These and other embodiments will be clear based on the following disclosure.

DETAILED DESCRIPTION

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure. Embodiments as disclosed herein should be considered within the scope of features and other embodiments illustrated in the figures herein, as follows.

Traditional camera or imaging systems allow the user to view the subject or scene being captured from the perspective of the camera. Some approaches include viewfinders, eyepieces, displays with preview, and live stream. However, a system where the camera does not have a viewfinder, display, or other such means to see the subject or scene being captured from the perspective of the camera, presents an undesirable uncertainty to the user about the camera field of view. While it is possible to trigger shots taken by the camera, the exact scene or perspective being captured may be unknown to the user at the moment of capture when there is no feedback to correct the camera field of view before triggering capture.

To resolve the above problems arising in the technical field of wearable devices with video camera accessories, embodiments as disclosed herein allow a user to get a sense of the field of view that would be covered by the camera. In some embodiments, a system includes a smart glass with a built-in or attached camera. The system may or may not have a display for the user. If a display exists, it may be unavailable for viewing the camera field of view, or it may be preferably devoted for other utilities.

In addition, to resolve the above problems arising in the technical field of wearable devices (e.g., a "smart glass") with video camera accessories, embodiments as disclosed herein allow a user to get a sense of the field of view that would be covered by the camera. In some embodiments, a system includes a smart glass with a built-in or attached camera. The system may or may not have a display for the user.

A smart glass device as disclosed herein includes a frame including eyepieces to provide a field of view to a user, a forward-looking camera mounted on the frame, a sensing device facing the user for tracking a pupil position of the user, a processing circuit configured to identify a region of interest within the field of view of the user, and an interface device to indicate to the user that a field of view of the forward-looking camera is misaligned with the region of interest. In some embodiments, a memory may store instructions which, when executed by the processor, cause the smart glass to perform one or more steps in a method consistent with the present disclosure. The memory may also store data, such as calibration data for the position and orientation of the forward-looking camera relative to the user field of view.

Embodiments as disclosed herein use eye tracking tools to identify a region of interest in a scene viewed through a smart glass as disclosed above. In addition, embodiments as disclosed herein read user gesture to identify a region of interest in a scene viewed through a smart glass as disclosed above. In some embodiments, a system is designed such that the camera captures the scene, including some example hand gestures from the user. The frames including hand gestures are run through a gesture recognition system to recognize the moment when the appropriate gesture is presented by the user, and identify the region of interest based on a reading of the hand gesture from the user.

Figure 1:
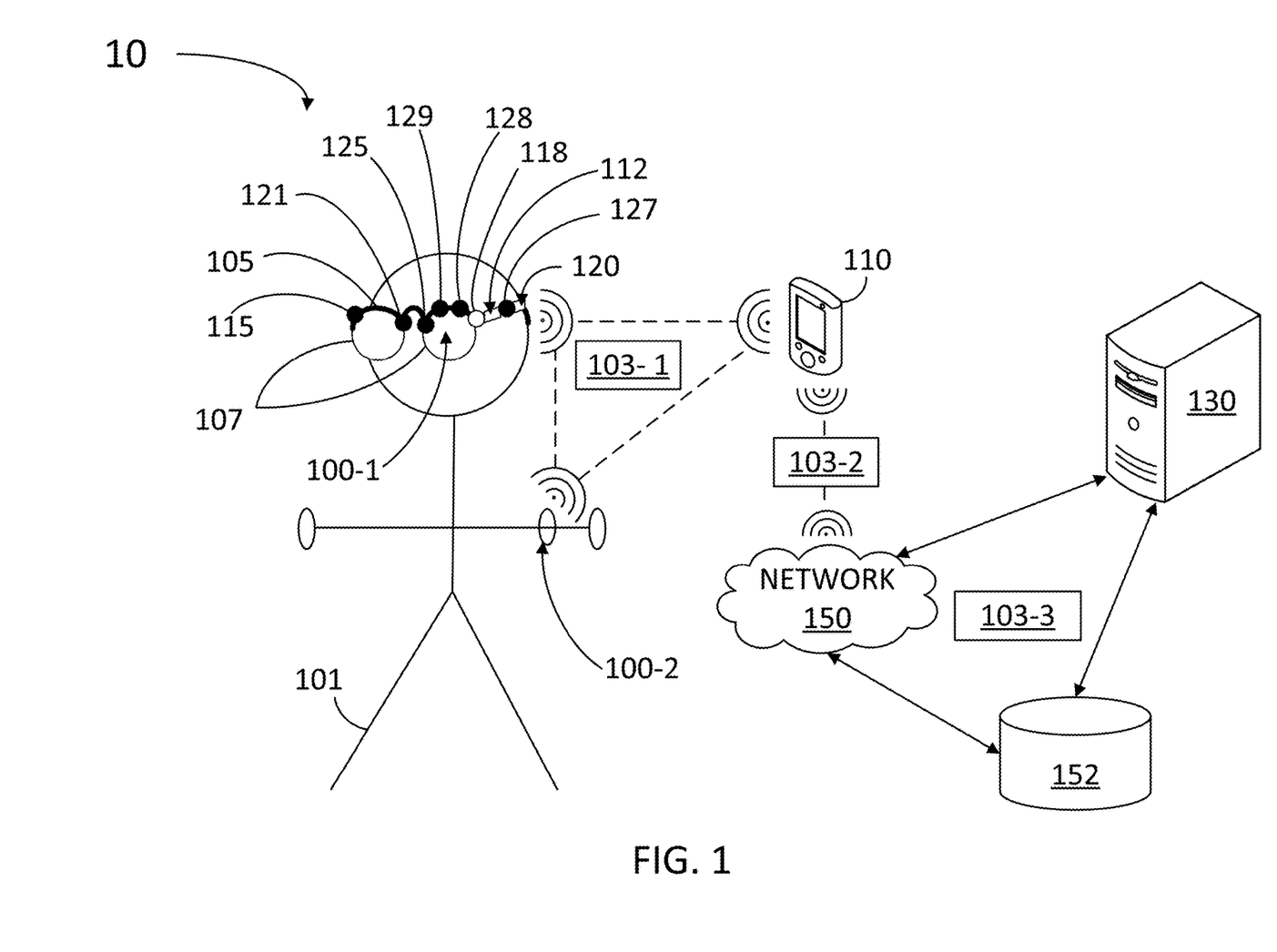
FIG. 1 illustrates an architecture including one or more wearable devices coupled to one another, to a mobile device, a remote server and to a database, according to some embodiments.

FIG. 1 illustrates an architecture 10 including one or more wearable devices 100-1 (e.g., a smart glass) and 100-2 (e.g., a smart watch) coupled to one another (hereinafter, collectively referred to as "wearable devices 100"), to a mobile device 110, a remote server 130, and to a database 152, according to some embodiments. Smart glass 100-1 may be configured for AR/VR applications, and mobile device 110 may be a smart phone, all of which may communicate with one another via wireless communications and exchange a first dataset 103-1. Dataset 103-1 may include a recorded video, audio, or some other file or streaming media. A user 101 of wearable devices 100 is also the owner or is associated with mobile device 110. In some embodiments, the smart glass may directly communicate with the remote server, the database, or any other client device (e.g., a smart phone of a different user, and the like) via the network. The mobile device may be communicatively coupled with a remote server and a database via a network 150, and transmit/share information, files, and the like with one another, e.g., dataset 103-2 and dataset 103-3 (hereinafter, collectively referred to as "datasets 103"). Network 150 may include, for example, any one or more of a local area network (LAN), a wide area network (WAN), the Internet, and the like. Further, the network can include, but is not limited to, any one or more of the following network topologies, including a bus network, a star network, a ring network, a mesh network, a star-bus network, tree or hierarchical network, and the like.

Smart glass 100-1 may include a frame 105 including eyepieces 107 to provide an image to user 101. A camera 115 (e.g., forward-looking) is mounted on frame 105, and has a field of view (FOV). A sensing device 128 facing the user is configured to track a pupil position of the user. Processor 112 is configured to identify a region of interest (ROI) within the image viewed by user 101. An interface device 129 indicates to user 101 that the FOV of camera 115 at least partially misses the ROI of the user. In some embodiments, smart glass 100-1 may also include a haptic actuator 125 to recreate a sense of touch to the user, for a VR/AR application, and a speaker 127 to communicate to user 101 voice or sound signals indicative of adjusting a gaze direction for improving the FOV of camera 115 (e.g., obtained with pupil tracking information from sensing device 128). For example, in some embodiments, haptic actuator 125 may include a vibrating component to indicate to the user to nudge their head position in a desired direction to align the FOV of forward-looking camera 115 with the ROI, or to confirm the user that the FOV is properly centered on the ROI.

In some embodiments, smart glass 100-1 may include multiple sensors 121 such as IMUs, gyroscopes, microphones, and capacitive sensors configured as touch interfaces for the user. Other touch sensors may include a pressure sensor, a thermometer, and the like.

In addition, wearable devices 100, or mobile device 110, may include a memory circuit 120 storing instructions, and a processor circuit 112 configured to execute the instructions to cause smart glass 100-1 to perform, at least partially, some of the steps in methods consistent with the present disclosure. Memory circuit 120 may also store data, such as calibration data for the position and orientation of camera 115 relative to the FOV of the user. In some embodiments, smart glass 100-1, mobile device 110, server 130, and/or database 152 may further include a communications module 118 enabling the device to wirelessly communicate with remote server 130 via network 150. Smart glass 100-1 may thus download a multimedia online content (e.g., dataset 103-1) from remote server 130, to perform at least partially some of the operations in methods as disclosed herein. In some embodiments, memory 120 may include instructions to cause processor 112 to receive and combine signals from sensors 121, avoid false positives, and better assess user intentions and commands when an input signal is received from a user interface.

Figure 2:
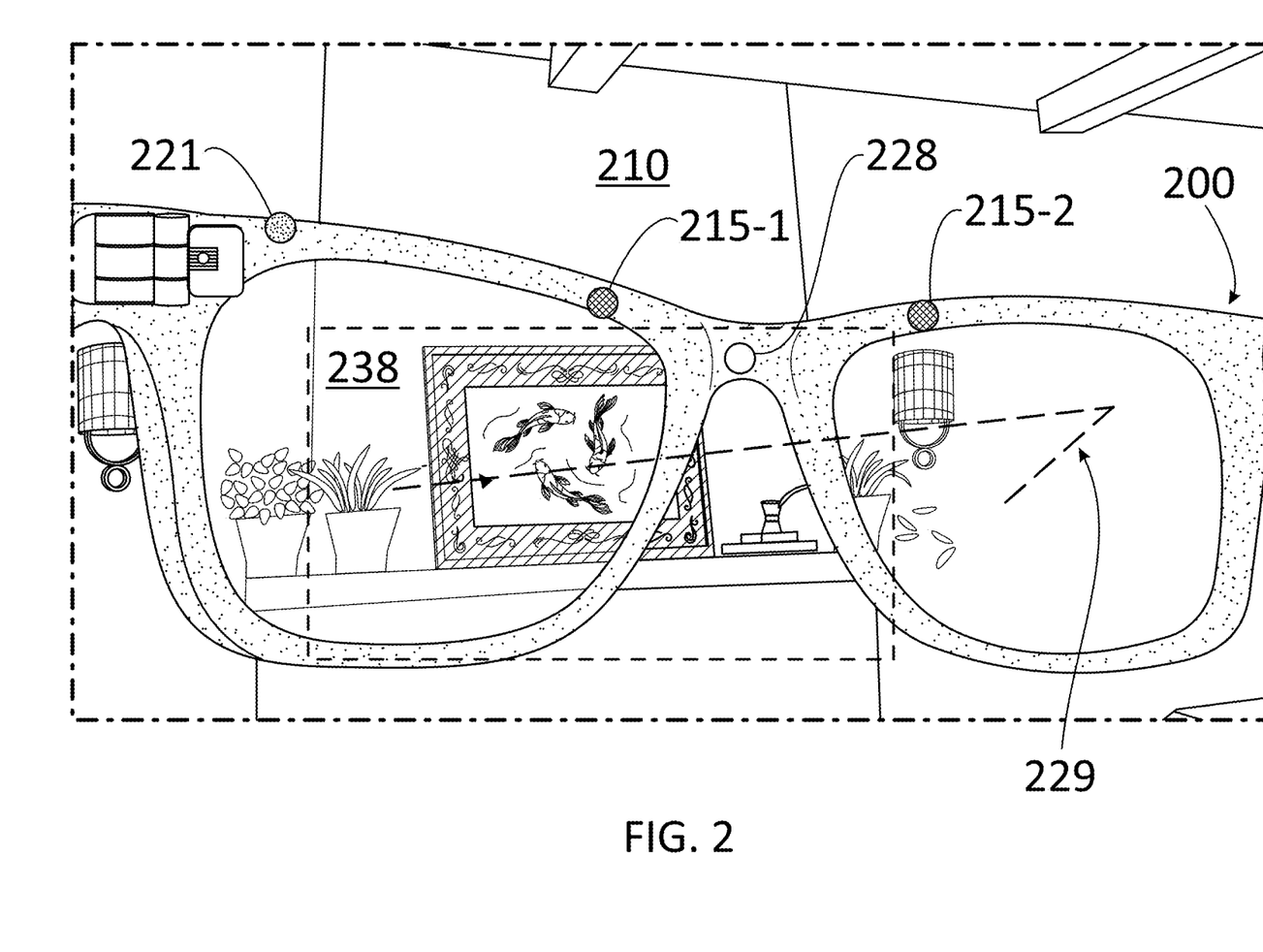
FIG. 2 illustrates a smart glass including a microphone to receive a voice command from the user to adjust the field of view of a camera based on an object of interest, according to some embodiments.

FIG. 2 illustrates a smart glass 200 including a microphone 221 to receive a voice command from the user to adjust an FOV 238 of a camera 215-1 based on an object of interest 229, according to some embodiments. Object of interest 229 may be identified from a scene 210 by the user via the voice command or pointed at using a hand gesture. In some embodiments, object of interest 229 may be the vergence point of the pupil positions for the user, as determined by an eye tracking sensor 228. In response, the system may adjust the depth of field and focus of camera 215-1 or move a sensor crop region based on the gaze signal. In some embodiments, the system may actuate a motor in camera 215-1 to direct FOV 238 to the desired location. In some embodiments, the system may determine that a second forward-looking camera 215-2 may be better located to have FOV 238 centered around object of interest 229. First and second forward-looking cameras 215-1 and 215-2 will be collectively referred to, hereinafter, as forward-looking cameras 215.

Figure 3:
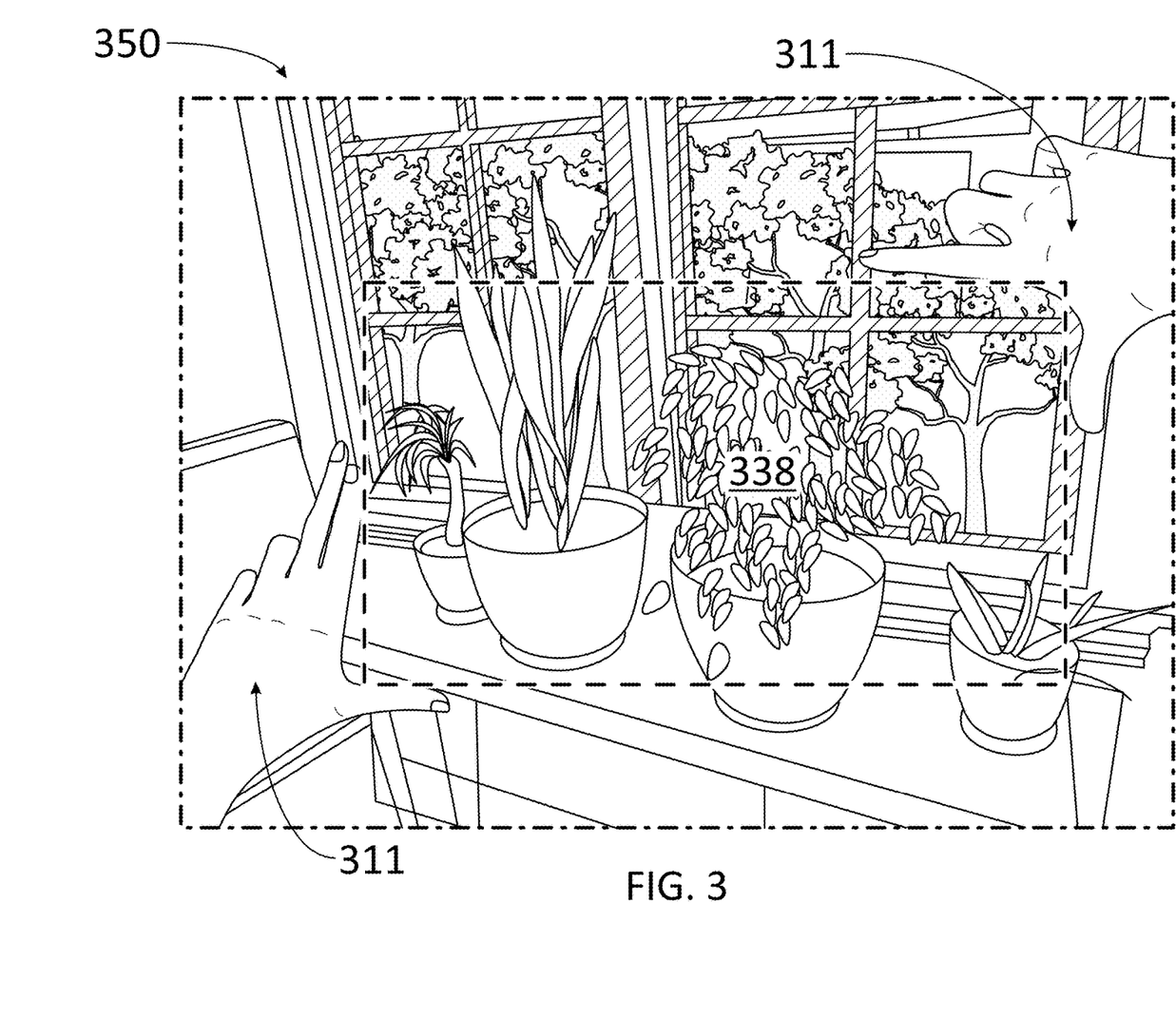
FIG. 3 illustrates a gesture with two hands framing the objects of interest, according to some embodiments.

FIG. 3 illustrates a user gesture 350 with two hands 311 framing an ROI 338 for a smart glass, according to some embodiments. A forward-looking camera mounted on the smart glass captures the gesture and by using image recognition and algorithms such as artificial intelligence and/or machine learning, a processor in the smart glass interprets the gesture and selects ROI 338 delimited in its opposite corners by user hands 311.

Figure 4:
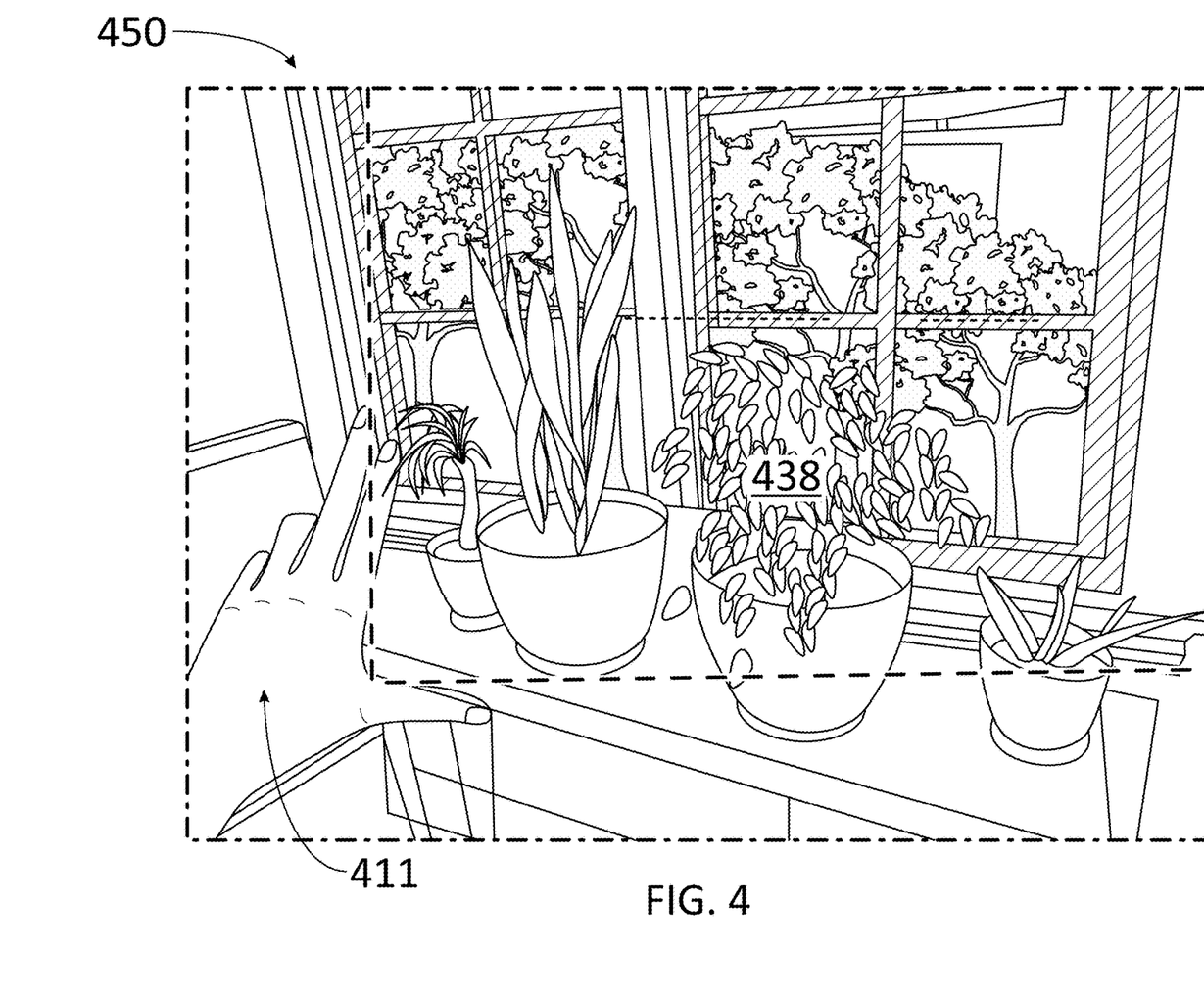
FIG. 4 illustrates an incomplete hand gesture, according to some embodiments.

FIG. 4 illustrates a user gesture 450 using only one hand 411 for framing an ROI 438 for a smart glass, according to some embodiments. Similarly to a two-hand gesture (cf. gesture 350), a forward-looking camera may capture user gesture 450, and a processor may be configured to read, interpret, and complete ROI 438 even when a second hand pointing the opposite corner of ROI 438 is missing.

Figure 5:
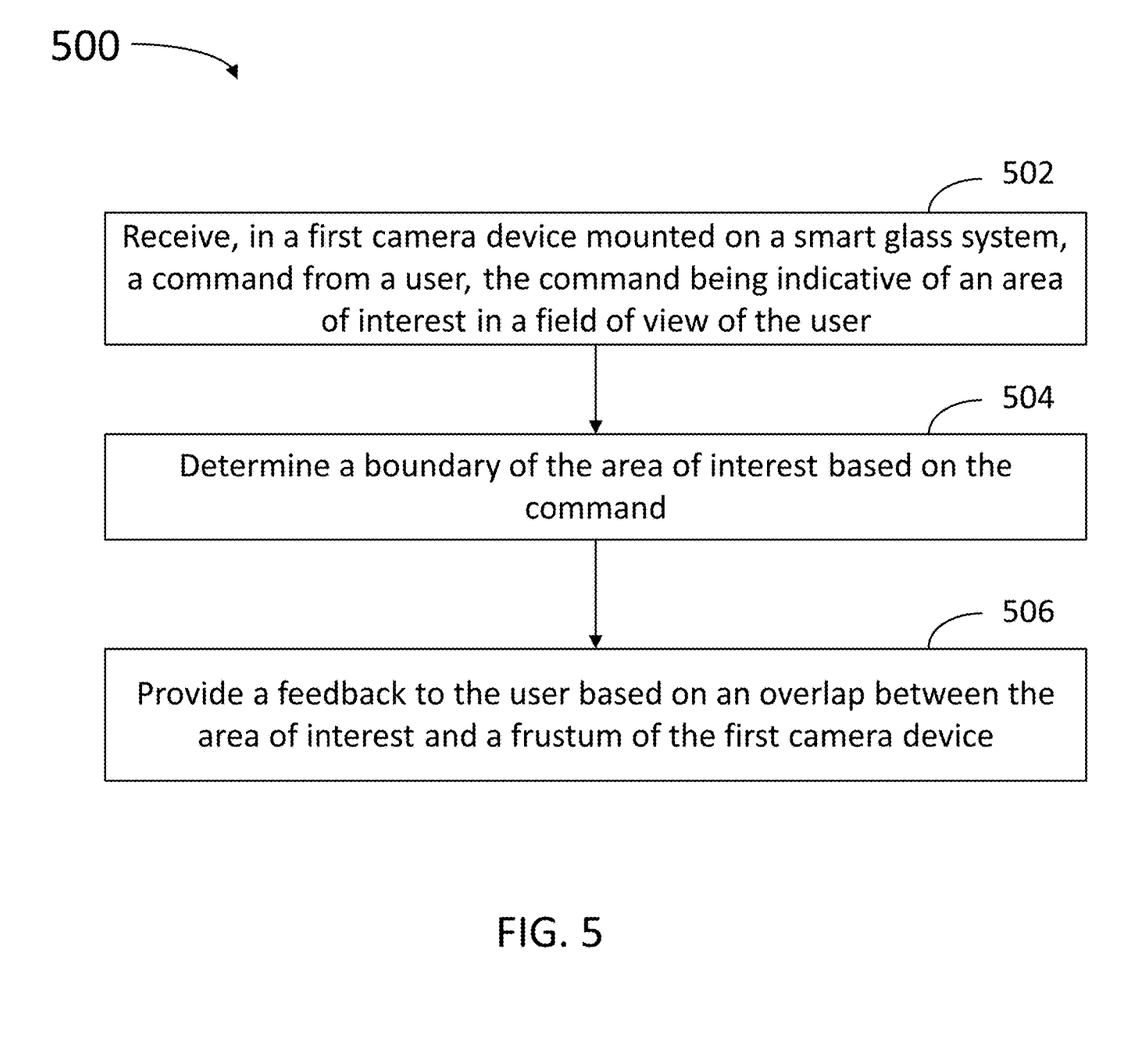
FIG. 5 is a flow chart illustrating steps in a method for aligning a field of view in a camera device with a region of interest for a user of a smart glass, according to some embodiments.

FIG. 5 is a flow chart illustrating steps in a method 500 for aligning a field of view in a camera device with a region of interest for a user of a smart glass, according to some embodiments. (e.g., smart glasses 100-1 and 200, and cameras 115 and 215). The smart glass may include, in addition to the camera, an eye tracking sensor, a memory storing instructions, and a processor configured to execute the instructions to perform at least partially one or more steps in method 500 (e.g., sensing devices 128 and 228, memory 120, and processor 112). A method consistent with the present disclosure may include at least one of the steps in method 500, or two or more steps in method 500 performed in a different order, simultaneously, quasi-simultaneously, or overlapping in time.

Step 502 includes receiving, in a first camera device mounted on a smart glass system, a command from a user, the command being indicative of an area of interest in a forward-image viewed by the user. In some embodiments, step 502 includes identifying the command as a hand gesture from the user with a hand gesture recognition model based on a learned history of recorded hand gestures from the user. In some embodiments, step 502 includes receiving one of: a two-hand gesture marking opposite corners of the area of interest, a finger gesture delineating a border of the area of interest, a two-finger gesture forming a cross-hair indicating a center of the area of interest, or a circle gesture including the center of the area of interest.

Step 504 includes determining a boundary of the area of interest based on the command.

Step 506 includes providing a feedback to the user based on an overlap between the area of interest and a field of view of the camera device. In some embodiments, step 506 includes activating an actuator to indicate to the user to move a head position to improve an alignment between the area of interest and the field of view of the camera device. In some embodiments, step 506 includes providing a feedback to the user when the command is not recognized by a hand gesture recognition model. In some embodiments, step 506 includes providing a feedback to the user that the hand gesture is incomplete within the field of view of the camera device.

Hardware Overview

Figure 6:
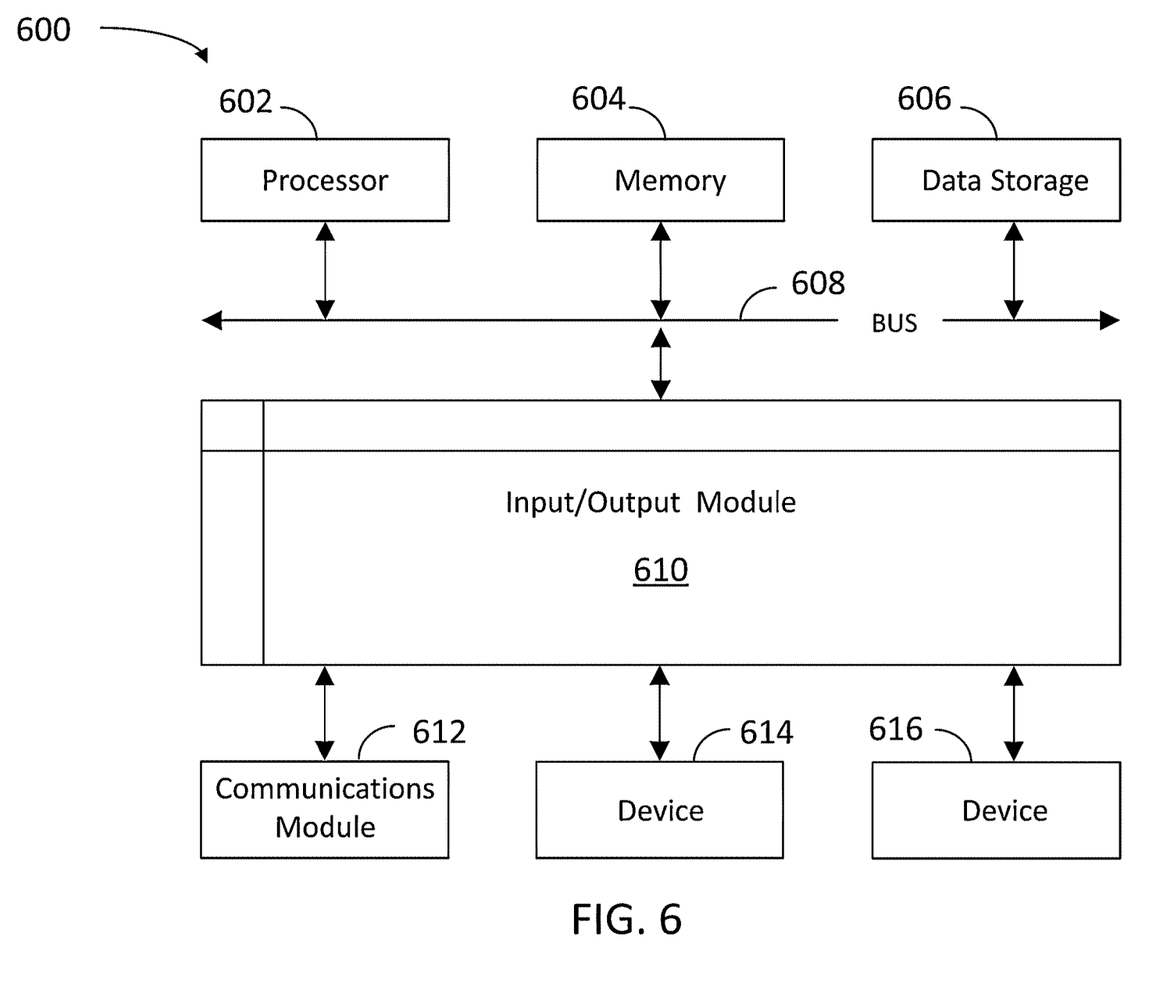
FIG. 6 is a block diagram illustrating an exemplary computer system with which a headset and methods for use of the same can be implemented, according to some embodiments.

FIG. 6 is a block diagram illustrating an exemplary computer system 600 with which the headset 100 of FIG. 1, and method 500 can be implemented, according to some embodiments. In certain aspects, computer system 600 may be implemented using hardware or a combination of software and hardware, either in a dedicated server, or integrated into another entity, or distributed across multiple entities. Computer system 600 may include a desktop computer, a laptop computer, a tablet, a phablet, a smartphone, a feature phone, a server computer, or otherwise. A server computer may be located remotely in a data center or be stored locally.

Computer system 600 includes a bus 608 or other communication mechanism for communicating information, and a processor 602 (e.g., processor 112) coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memory 120), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, e.g., one or more modules of computer program instructions encoded on a computer-readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled with bus 608 for storing information and instructions. Computer system 600 may be coupled via input/output module 610 to various devices. Input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, input/output module 610 is configured to connect to a plurality of devices, such as an input device 614 and/or an output device 616. Exemplary input devices 614 include a keyboard and a pointing device, e.g., a mouse or a trackball, by which a consumer can provide input to the computer system 600. Other kinds of input devices 614 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 616 include display devices, such as an LCD (liquid crystal display) monitor, for displaying information to the consumer.

According to one aspect of the present disclosure, wearable devices 100 can be implemented, at least partially, using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires forming bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A device, comprising:
    a frame including an eyepiece to provide a forward-image to a user;
    a first forward-looking camera mounted on the frame, the first forward-looking camera having a first field of view within the forward-image;
    a sensor configured to receive a command from the user, the command indicative of a region of interest within the forward-image;
    a second forward-looking camera mounted on the frame, wherein the second forward-looking camera is activated when the first field of view of the first forward-looking camera is misaligned with the region of interest;

a first interface device to indicate to the user to alter a position of the user to cause an adjustment to an alignment between the region of interest and at least one of the first field of view of the first forward-looking camera and a second field of view of the second forward-looking camera; and a second interface device to indicate to the user that the region of interest is aligned with at least one of the first field of view and the second field of view, wherein the second interface device is different from the first interface device.

2. The device of claim 1, wherein the sensor includes a microphone configured to receive a voice command from the user.

3. The device of claim 1, wherein the sensor includes a capacitive sensor configured to receive a touch gesture from the user.

4. The device of claim 1, wherein the sensor is an eye tracking sensor, further comprising a processor configured to determine a gaze direction of the user based on a signal from the eye tracking sensor, and to identify the region of interest as a portion of the forward-image centered along the gaze direction.

5. The device of claim 1, wherein the sensor is the first forward-looking camera and the command from the user is a hand gesture.

6. The device of claim 1, further comprising a processor configured to receive a hand gesture from the user and identify the command indicative of the region of interest within the first field of view based on the hand gesture.

7. The device of claim 1, further comprising a processor configured to identify, in an image from the first forward-looking camera, an object of interest based on the command from the user.

8. The device of claim 1, wherein the command from the user includes activating the second forward-looking camera when the first field of view of the first forward-looking camera is misaligned with the region of interest.

9. The device of claim 1, wherein the first forward-looking camera includes a motion actuator configured to adjust the first field of view of the first forward-looking camera based on the command from the user.

10. The device of claim 1, wherein the eyepiece comprises a display configured to show the user the first field of view of the first forward-looking camera.

11. A computer-implemented method, comprising:

receiving, in a first camera device mounted on a smart glass system, a command from a user, the command being indicative of an area of interest in a forward-image viewed by the user;

determining a boundary of the area of interest based on the command;

activating a second camera device mounted on the smart glass system when a first field of view of the first forward-looking camera is misaligned with the area of interest;

providing, by a first interface device, a first feedback to indicate to the user to alter a position of the user to cause an adjustment to an alignment between the area of interest and at least one of the first field of view of the first camera device and a second field of view of the second camera device; and providing, by a second interface device, a second feedback to the user based on an overlap between the area of interest and at least one of the first field of view and the second field of view, wherein the second interface device is different from the first interface device.

12. The computer-implemented method of claim 11, wherein the command is a voice command and receiving the command comprises converting the voice command to a text command and parsing the text command for a keyword indicative of a user intention.

13. The computer-implemented method of claim 11, wherein the command is a voice command, further comprising identifying the user based on a voice signature, and authenticating the voice command when the user is identified.

14. The computer-implemented method of claim 11, wherein the command is a voice command indicating an object of interest in the forward-image displayed to the user, further comprising centering the first field of view of the first camera device around the object of interest.

15. The computer-implemented method of claim 11, further comprising receiving a second command from the user responsive to the first feedback or the second feedback, the second command directed to activating the second camera device.

16. The computer-implemented method of claim 11, wherein receiving the command from the user comprises identifying a hand gesture from the user with a hand gesture recognition model based on a learned history of recorded hand gestures from the user.

17. The computer-implemented method of claim 11, wherein receiving the command from the user comprises receiving one of: a two-hand gesture marking opposite corners of the area of interest, a finger gesture delineating a border of the area of interest, a two-finger gesture forming a cross-hair indicating a center of the area of interest, or a circle gesture including the center of the area of interest.

18. The computer-implemented method of claim 11, wherein providing the first feedback comprises activating an actuator to indicate to the user to move a head position to improve the alignment between the area of interest and the first field of view of the first camera device.

19. The computer-implemented method of claim 11, wherein the command is a hand gesture, further comprising providing a feedback to the user when the hand gesture is not recognized by a hand gesture recognition model.

20. The computer-implemented method of claim 11, wherein the command is a hand gesture from the user, further comprising providing a feedback to the user that the hand gesture is incomplete within the first field of view of the first camera device.

* * * * *